Figure 1:
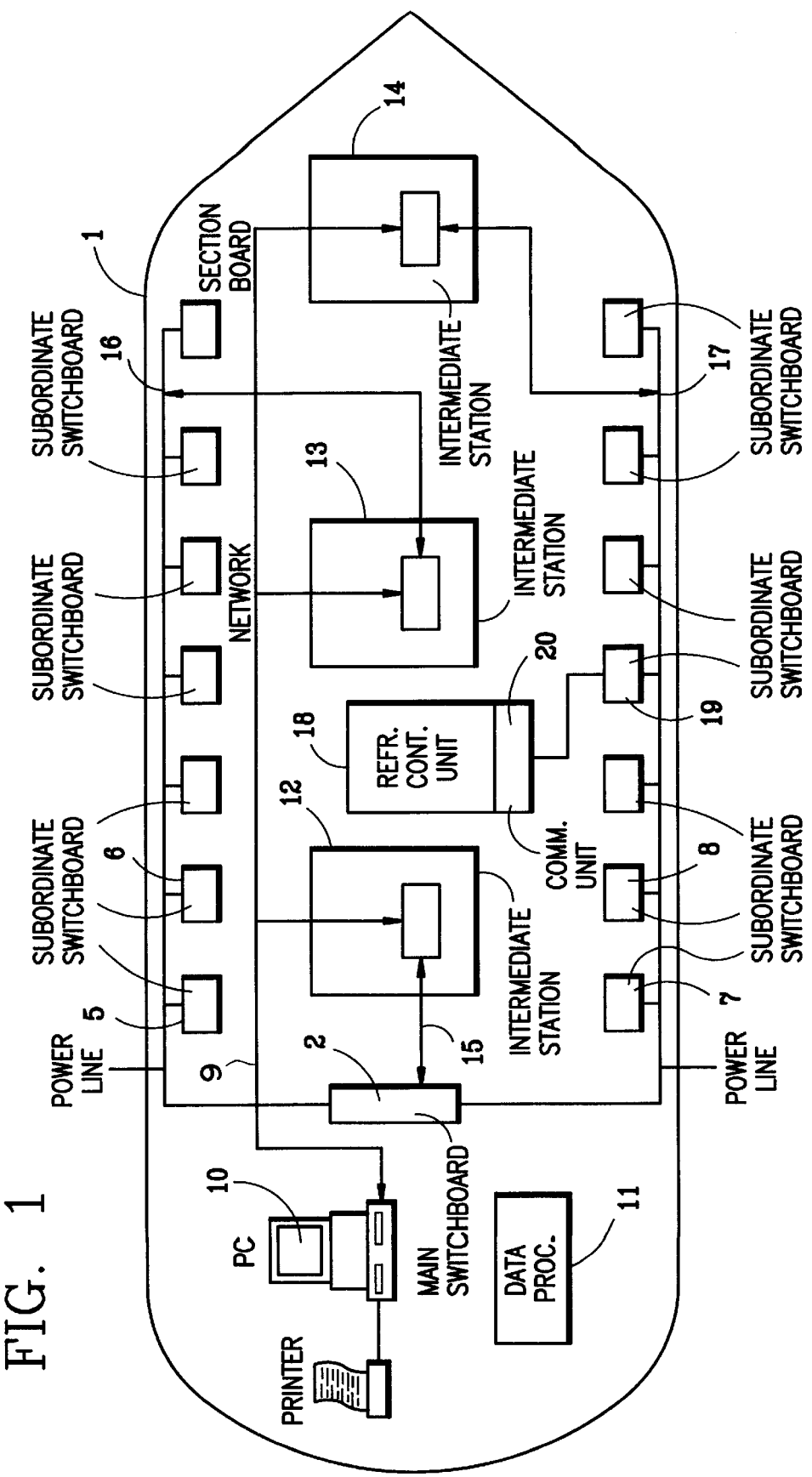

United States Patent [19]
Jensen et al.

[11] Patent Number: 5,973,610
[45] Date of Patent: Oct. 26, 1999

[54] SYSTEM FOR AUTOMATED SELECTION OF A COMMUNICATIONS UNIT FOR REFRIGERATING CONTAINERS

[75] Inventors: Peter Nyegaard Jensen, Silkeborg; Kaare Knakkergaard, Århus N; Per Juul Hansen, Hjortshøj; Bjørn Sahl, Horsens, all of Denmark

[73] Assignee: Lanng & Stelman A/S, Viby J., Denmark

[21] Appl. No.: 08/640,804

[22] PCT Filed: Nov. 3, 1994

[86] PCT No.: PCT/DK94/00415

§ 371 Date: Aug. 7, 1996

§ 102(e) Date: Aug. 7, 1996

[87] PCT Pub. No.: WO95/12958

PCT Pub. Date: May 11, 1995

[30] Foreign Application Priority Data

Nov. 3, 1993 [DK] Denmark .................................. 1244/93

[51] Int. Cl.⁶ .................................................. G06F 15/00
[52] U.S. Cl. ............................... 340/825.16; 340/825.06; 340/825.54; 340/825.07
[58] Field of Search .......................... 340/825.16, 825.06, 340/825.07, 539, 572, 502, 310.06, 825.54; 395/200.01, 200.09, 200.12

[56] References Cited

U.S. PATENT DOCUMENTS

| | | |
|---|---|---|
| 3,961,323 | 6/1976 | Hartkorn ................................. 340/280 |
| 4,234,926 | 11/1980 | Wallace et al. .......................... 364/551 |
| 4,885,564 | 12/1989 | Vercellotti et al. ................. 340/310.06 |
| 4,896,277 | 1/1990 | Vercellotti et al. ................. 340/551.01 |
| 5,568,121 | 10/1996 | Lamensdorf ............................. 340/539 |

*Primary Examiner*—William A. Cuchlinski, Jr.
*Assistant Examiner*—Yonel Beaulieu
*Attorney, Agent, or Firm*—Sixbey, Friedman, Leedom & Ferguson; David S. Safran

[57] ABSTRACT

Refrigerating containers (reefers) disposed in a seaboard terminal or onboard a ship and with a power supply via cables is monitored by means of built-in equipment and communicates via the power supply network (3, 4) via an intermediate station (12, 13 or 14) with a central monitoring station (10). In case disturbances on the power supply network causes unreliable data transmission the system automatically selects an alternative communications path via another of the intermediate stations (12, 13, 14).

9 Claims, 4 Drawing Sheets

IF Message = RDCMapCmd
THEN
IF Container-ID is unknown
THEN
Register container
ELSE
IF Reply from expected master
THEN
Register container
ELSE
Reject message
ELSE
Perform communication according to the container state.

FIG.4

SYSTEM FOR AUTOMATED SELECTION OF A COMMUNICATIONS UNIT FOR REFRIGERATING CONTAINERS

The invention relates to a system for automated selection of a communications unit for refrigerating containers which acts as an intermediate station between a refrigerating container unit which is to be monitored and a central monitoring station where all refrigerating containers as power consumers and transmitters/receivers are connected to the power supply grid using coded messages.

The international standard ISO10368 (Freight thermal containers—Remote condition monitoring) regulates the manner in which a single central monitoring station exchanges information by means of power cables with a number of communication units, modems, which are fitted into refrigerating containers placed onboard ships. The purpose of this is to perform central monitoring of the climatic conditions in the individual refrigerating containers and when needed to perform changes in the otherwise local control of refrigerating power, blowers, etc. Using the terminology of the international standard mentioned above and according to a recommended design, an MMU (Master Monitoring Unit) is used as a central monitoring station which via an HCCU or LCCU (High and Low Data Rate Central Control Unit, respectively) communicates with several RCDs (Remote Communications Devices) which are each closely related to a refrigerating container. A refrigerating container with a communications unit has a permanent identification code.

However, it has turned out in practice that in larger areas it is not sufficient to rely on the communication which may be transmitted on varying cable lengths from the individual container to the central monitoring station, and hence intermediate stations are used which each have the possibility to monitor a number of refrigerating containers and to communicate with the central monitoring station or a network of central monitoring stations. These provide an opportunity for an improvement in the reliability of communication which has not been realized until now. When deposing and connecting a refrigerating container to the power grid, in practice one would not wish to perform a manual identification of it towards the system nor would one wish to be tied to a communications protocol for deposing, such as filling up an area in a seaboard terminal in any particular order. This would also be in conflict with the desire to distribute the refrigerating containers while taking the stability of a ship into account, a distribution which is performed by a central inventory control system dependent on the knowledge of the contents of the individual refrigerating containers.

It has hence been realized that it is possible to expand the automatic logging-on to the network which is already known, by letting the system find the route of communication which provides the largest reliability of communication as well as finding alternative routes of communication in case of serious interference, possibly break-down of a communications route already established. In other words, the system is built in such a way that an individual refrigerating container is at any time communicating with an optional central monitoring station which is connected by a network, as long as the quality of communication is sufficient.

This is obtained in a structure of the communications system which is particular in that the central monitoring station transmits a query code at regular intervals which causes a response from the refrigerating container units, that newly arrived containers are given a network address and a responsible intermediate station which takes over the direct communication between the refrigerating container unit and the central monitoring station, that errors which are determined in the structure of data or data content causes a predetermined number of attempts from the first responsible intermediate station of reestablishing the communications link, and that other intermediate stations subsequently try to take over the communication with the refrigerating container. Such a structure enables safe and efficient monitoring of refrigerating containers on ships as well as in port terminals.

An advantageous embodiment is particular in that the intermediate stations attempt to establish communication in an order, the priority of which is decided from an expected probability of secure communication.

A further advantageous embodiment utilizes error correcting codes for the communication and error conditions are recognized when the receiving error correcting networks have been active.

With a view to obtaining as quickly as possible that communications path which according to plan has been considered as the most secure, in a further advantageous embodiment the first responsible intermediate station tries to reestablish the communication every other time reestablishment is tried.

An advantageous embodiment allows changes based upon experience obtained with the system and a given load, in that the priority order may be changed by the program in the central monitoring station.

In order that a communications system according to the invention may adjust itself, a further advantageous embodiment is particular in that the central monitoring station prepares a statistical distribution of the communications quality for each power line connection and changes the order of priority correspondingly.

In practice the communication occurs by transmission of a query code from the central monitoring station which releases a receipt from all refrigerating containers connected to the power line. Thus the system obtains an overview of the connected refrigerating containers and such a query is repeated regularly in order that arrival and departure of refrigerating containers may be monitored. In case the receipt shows that it is a new container, a fast connection is attempted, which i.a. comprises the definition of a network address which is particular to that refrigerating container and which is generally different from its Identification Code according to section 4.2.2 in ISO6346-1984 (Freight containers—Coding, identification and marking). Each refrigerating container position (i.e. a "parking space" with a power line connection) has, by means of the inventory control type program which distributes the placement of the containers, coded into it a preferred central unit with which to communicate, but this may be changed according to a priority order. As the starting point for selecting an intermediate station for a container information on the expected "parking space" which has been attributed by the inventory control type program is used. In case erroneous codes are generated during communication, the same central unit will try to reestablish communication, but if the bad communication condition prevails, another central unit will try if a better communications path might be available under the particular circumstances. The reason for changes in the quality of communication is that many intermittent and strong sources of electrical noise are present, some of which are radiated on the same cable network which supplies power and constitutes the communication path.

The invention hence consists in an automatic control of attempts to establish a communication between the unit which is to be monitored, also termed the slave modem, and an intermediate station which has been appointed beforehand, and to perform a switch to another intermediate station in case the system determines that the quality of the communication is too poor. There are many ways in which it may be recognized that an error has occurred in transmission, e.g. the use of a limited table of acceptable sequences or by using error correcting codes. This may occur by returning a receipt sequence containing error correcting codes from the slave modem. In case the error correction which consists in the activation of a calculating program sequence has been active, the system regards the communication path as being faulty.

An intermediate station uses an internal table of those network addresses which have been used in communication with slave modems. A network address for a slave modem is deleted from the table in case the intermediate station has been active in a predetermined number of minutes, during which the transmission of a minimum number of messages to the slave modem has been attempted without obtaining a valid receipt.

Figure 2:
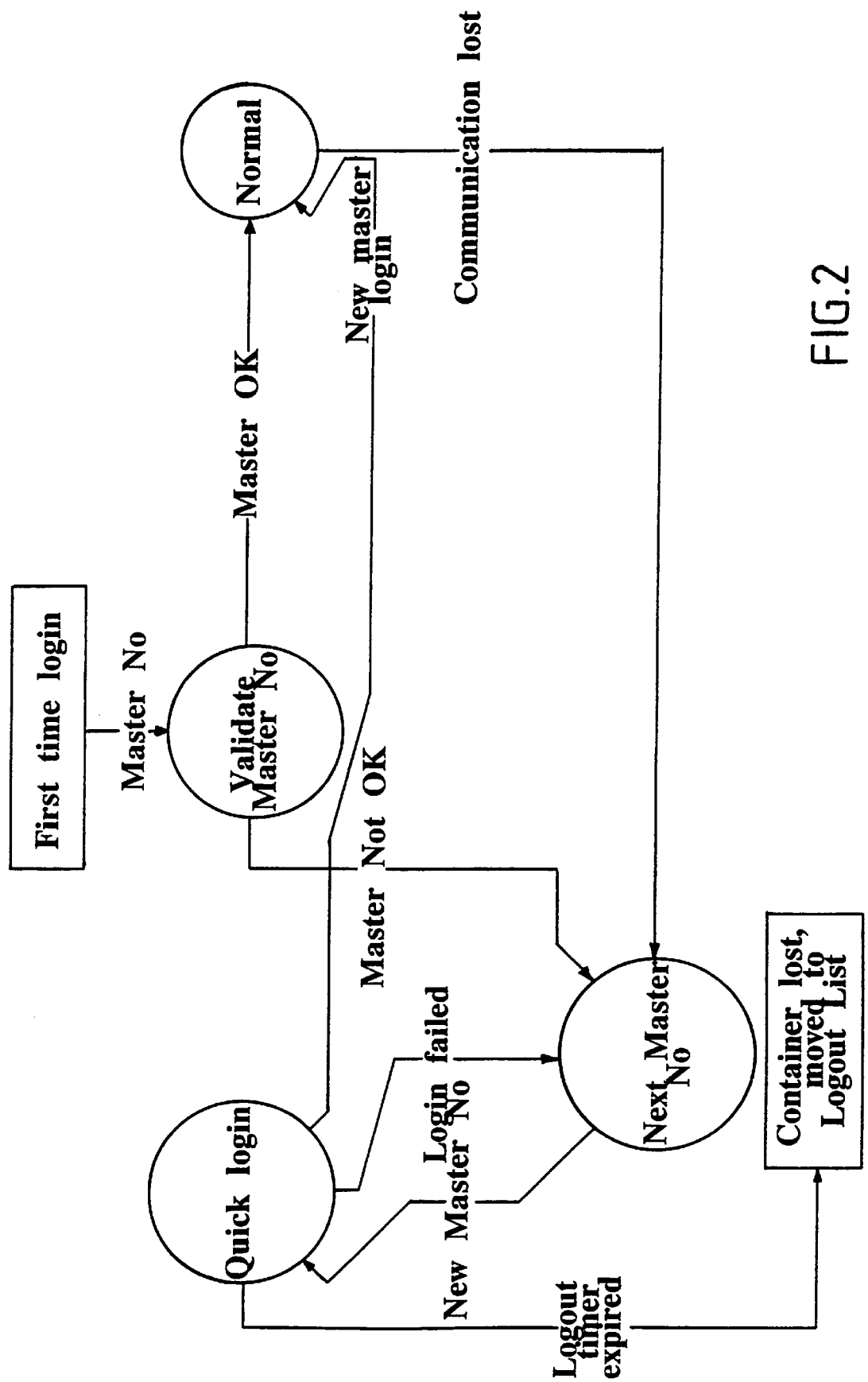
Figure 3:
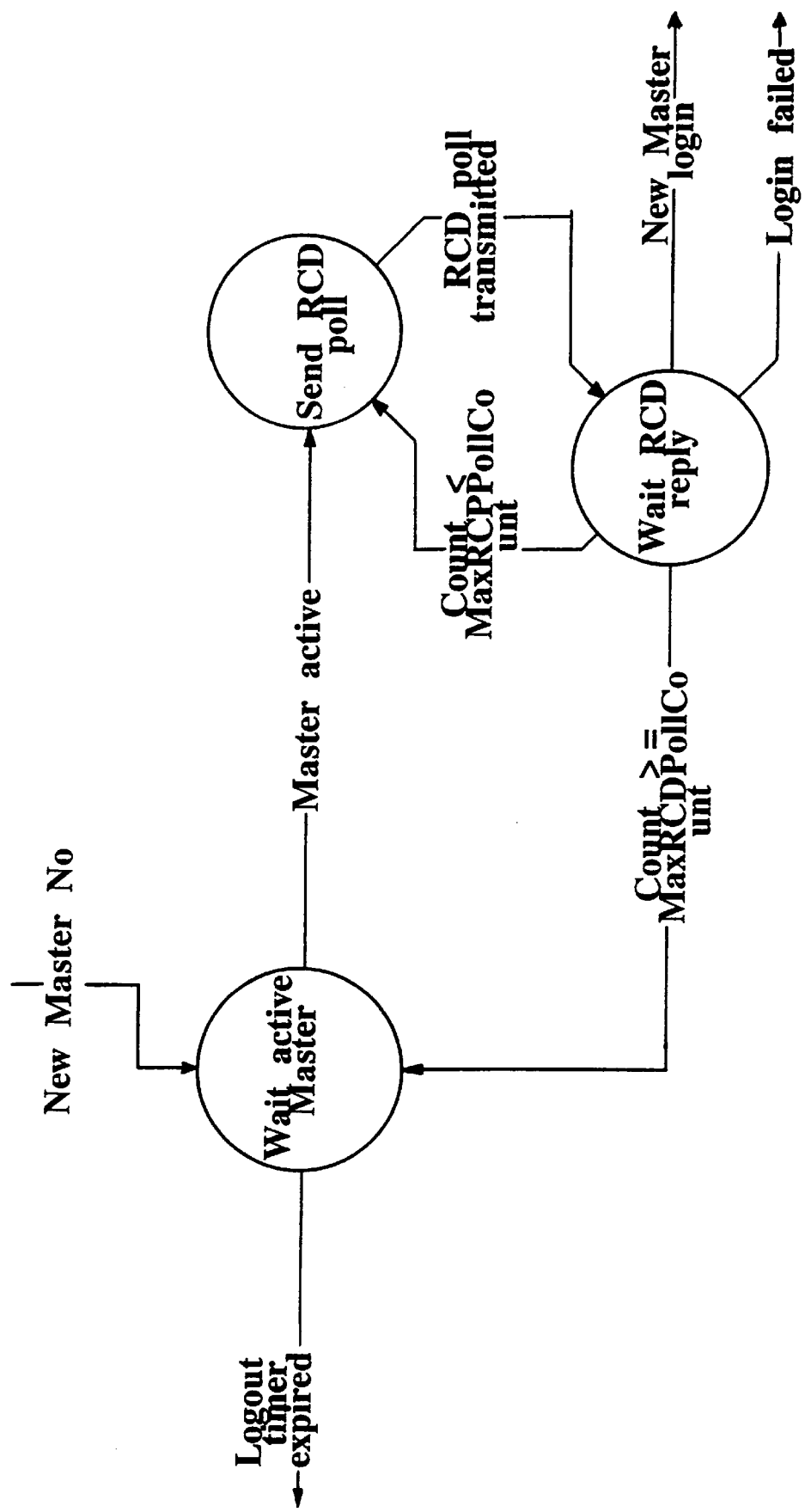

The invention will be explained in greater detail in the following with reference to the drawing, in which FIG. 1 in schematic form shows a ship with refrigerating container positions and a communications network, FIG. 2 shows a decision and state diagram for a first connection, FIG. 3 shows a decision and state diagram for attempts to establish a communications connection after the determination of a faulty channel, and FIG. 4 shows the sorting of the attached network addresses in order that double postings are avoided.

In FIG. 1 a ship 1 is shown schematically in outline where the power supply starts at the main switchboard 2 and via power cables 3 and 4 to subordinate switchboards, of which a number are indicated as 5, 6, 7, 8, and 19. A local area network 9 for data communication is installed with a central monitoring station 10 in the form of a PC type controller. A dedicated data processor 11 is attached which is programmed to designate positions to arriving containers which are suitable with regard to the stability of the vessel and the destination of the individual container, i.e. logistic considerations. The data communications network connects a number of intermediate stations as shown at 12, 13, and 14. These intermediate stations are each connected to the power supply network by means of the connecting devices 15, 16, and 17, and are hereby enabled to function as links between the central monitoring station and the consumers, i.e. refrigerating containers, which are connected to the power supply. Only one is shown at 18 (even though several thousand may be present in practice), in that it is connected by means of a cable to the subordinate switchboard 19. A communications unit 20 is connected to the refrigerating container according to the international standard ISO10368. According to the invention the individual refrigerating containers are monitored according to a cyclic pattern whereby it is ascertained whether the expected refrigerating container (according to the position designated by the unit 11 which contains the inventory control type program) is in its appointed position and whether the communication is reliable. With the communications rate chosen there will be a cycle time of a few minutes, and problems with communication will cause more time to be spent on obtaining correct communication before the next container position is checked.

FIG. 2 shows a decision diagram for a first connection of a refrigerating container. The condition of the apparatus is shown by means of circles and the result of an action is shown as arrows pointing to the next condition. By way of example it is shown how a first connection to a master causes attempts to move the communication to the preferred master (via the condition Next Master Number) according to a stored table containing a preferred master and a number of masters having a lower priority. In one embodiment of the invention the preferred master is tried every other time. In the condition Validate Master No (Number) the following takes place: in case the refrigerating container has a defined position (commonly referred to as B (Bay), R (Row), and T (Tier)) the preferred master number is compared to the actual master number. In case they are identical or if no position is specified the condition is changed to Normal; in all other cases the condition is changed to Wait Active Master (FIG. 3).

The Next Master No (Number) condition is used when selecting the master number which will be used in the next assignment of a network address. In case it is the first attempt of connection following a breakdown in communications the preferred master number is selected. In case the momentary master number is different from the preferred, the preferred master number is selected as the subsequent number. In case the momentary master number is equal to the preferred master number (which, however, did not provide a good communication) another master number is selected according to the following criteria: in case the position is known the next number in the stored priority list table is selected, i.e. the second priority, unless this has just been tried, in which case the third priority is selected. The process goes on until communication has been established by means of a reliable master number, and the condition is changed to Next Active Master.

Fast logon (Quick Login) takes place in the following manner: a refrigerating container is in the Wait Active Master condition and remains there until the expected master becomes active, whereupon it changes condition to Send RCD Poll (RCD is Remote Communication Device, which is permanently connected the refrigerating container, cf. the introductory part of the description). As soon as the message (RCD Poll) has been transmitted the condition is changed to Wait RCD Reply, whereupon two situations may occur. Either the message is accepted, and the condition is changed to Normal (FIGS. 2 and 3). Or else an error condition is determined on the power supply network, and repeated attempts to call are performed: the condition is changed to Send RCD Poll until communication has been attempted a number of times which is internally termed "MaxRCD-PollCount" and which is programmable. The result of these cycles of the sequence may be either the condition Wait Active Master or Next Master No (because Login failed, FIG. 2). The moment that a Normal condition has been obtained data may be transmitted. It has hence been obtained that loss of communication, e.g. caused by interference, puts the apparatus into the condition Communication Lost which also triggers attempts using the next Master Number until the condition Normal has been established.

Since the communication to a slave modem may be changed to occur by means of another intermediate station, the network addresses may occur in the tables of several intermediate stations. After a certain number of transactions have occurred, the central monitoring station initiates a procedure where the identification codes from all the slave modems are read from the tables of the intermediate stations. A logical control is performed in order to avoid that double postings occur in the table which is generated thereby, according to the procedure which is shown in FIG. 4. Here RCDMapCmd means that the transmitted data are orders to map the network addresses.

We claim:

1. A system for automated selection of a responsible communications unit from among a plurality of communications units for refrigerating containers, the responsible communications unit acting as an intermediate station between a refrigerating container unit which is to be monitored and a central monitoring station where all refrigerating containers as power consumers and transmitters/receivers are connected to a power supply grid using coded messages;

wherein the central monitoring station transmits a query code at regular intervals which causes a response from the refrigerating container units, wherein newly arrived containers are given a network address and a first responsible communications unit, from among said plurality of communications units, which takes over direct communication between the refrigerating container unit and the central monitoring station, wherein errors which are determined in the structure of data or data content causes a predetermined number of attempts by the first responsible communications unit to reestablish communications with the refrigerating container unit and wherein other of said communications units subsequently try to take over the communication with the refrigerating container after said predetermined number of attempts.

2. A system for selection of a communications unit according to claim 1, characterized in that the communications units attempt to establish communication in an order, the priority of which is decided from an expected probability of secure communication.

3. A system for selection of a communications unit according to claim 2, characterized in that error correcting codes are utilized for the communication and error conditions are recognized when the receiving error correcting networks have been active.

4. A system for selection of a communications unit according to claim 3, characterized in that the first responsible communications unit tries to reestablish the communication every other time reestablishment is tried.

5. A system for selection of a communications unit according to claim 2, characterized in that the priority order is changeable by a program in the central monitoring station.

6. A system for selection of a communications unit according to claim 5, characterized in that the central monitoring station prepares a statistical distribution of the communications quality for each power line connection and changes the order of priority correspondingly.

7. A system for selection of a communications unit according to claim 1, characterized in that error correcting codes are utilized for the communication and error conditions are recognized when the receiving error correcting networks have been active.

8. A system for selection of a communications unit according to claim 1, characterized in that the first responsible communications unit tries to reestablish the communication every other time reestablishment is tried.

9. A system for selection of a communications unit according to claim 2, characterized in that the first responsible communications unit tries to reestablish the communication every other time reestablishment is tried.

* * * * *